United States Patent
Yoshimura et al.

(10) Patent No.: US 9,478,053 B2
(45) Date of Patent: Oct. 25, 2016

(54) IMAGE DISPLAY DEVICE AND IMAGE ADJUSTMENT METHOD OF IMAGE DISPLAY DEVICE

(71) Applicant: SEIKO EPSON CORPORATION, Tokyo (JP)

(72) Inventors: Jun Yoshimura, Beppu (JP); Makoto Kobayashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/041,405

(22) Filed: Sep. 30, 2013

(65) Prior Publication Data

US 2014/0098124 A1   Apr. 10, 2014

(30) Foreign Application Priority Data

Oct. 10, 2012   (JP) .................................. 2012-224849

(51) Int. Cl.
  *G06T 11/60*   (2006.01)
  *H04N 9/31*    (2006.01)
  *G06T 5/00*    (2006.01)

(52) U.S. Cl.
  CPC ............... *G06T 11/60* (2013.01); *G06T 5/006* (2013.01); *H04N 9/3185* (2013.01)

(58) Field of Classification Search
  None
  See application file for complete search history.

(56) References Cited

U.S. PATENT DOCUMENTS

| 7,104,653 B2 | 9/2006 | Moriwaki et al. |
| 8,985,782 B2 * | 3/2015 | Yoshimura ........... G03B 21/006 348/746 |
| 2003/0189675 A1 | 10/2003 | Itaki |
| 2007/0206159 A1 | 9/2007 | Itaki |

FOREIGN PATENT DOCUMENTS

| JP | 3092698 U | 3/2003 |
| JP | 2003-304552 A | 10/2003 |
| JP | A-2004-320662 | 11/2004 |
| JP | A-2010-250041 | 11/2010 |

* cited by examiner

Primary Examiner — Jwalant Amin
(74) Attorney, Agent, or Firm — Oliff PLC

(57) ABSTRACT

An image display device capable of performing a shape correction of an image displayed on an image display surface having a corner composed of a plurality of surfaces is provided. The image display device includes: an OSD processing unit that displays identification images respectively corresponding to four sides of an image; an identification image selection unit that accepts an operation of selecting the displayed identification image; a moving operation unit that accepts an operation of moving a node set at a predetermined position of the side corresponding to the selected identification image; and an image processing unit that corrects the shape of the image by moving, based on the operation accepted with the moving operation unit, the node of the side of the image displayed on an image display surface composed of a plurality of surfaces.

5 Claims, 11 Drawing Sheets

< FOR HORIZONTAL CORNER >

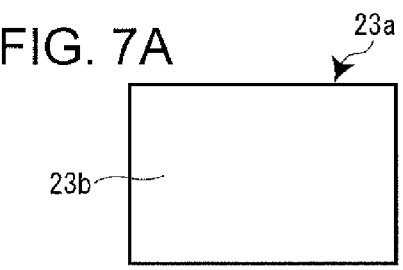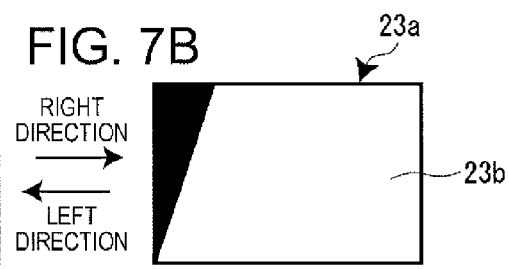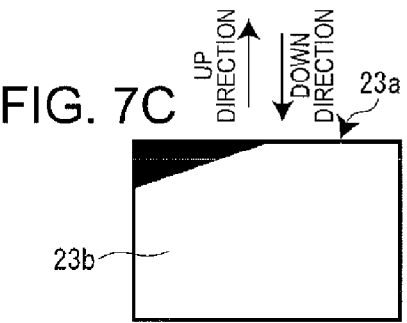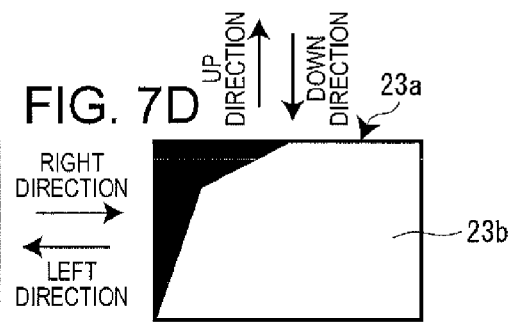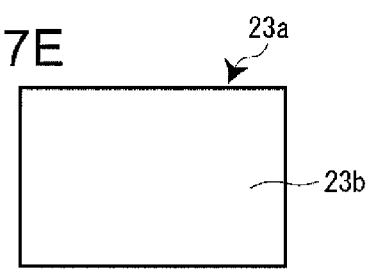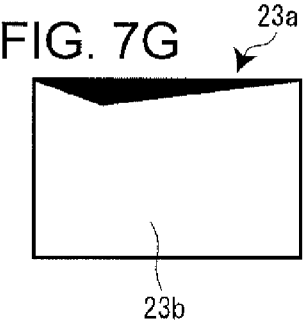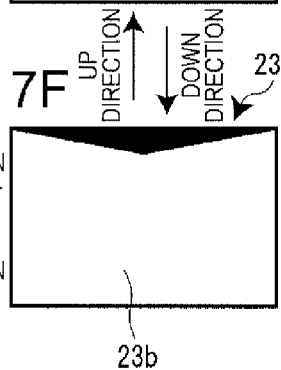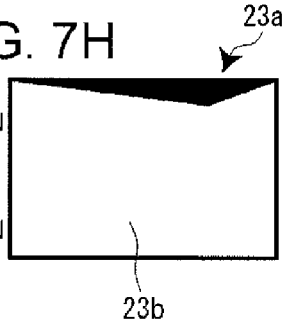

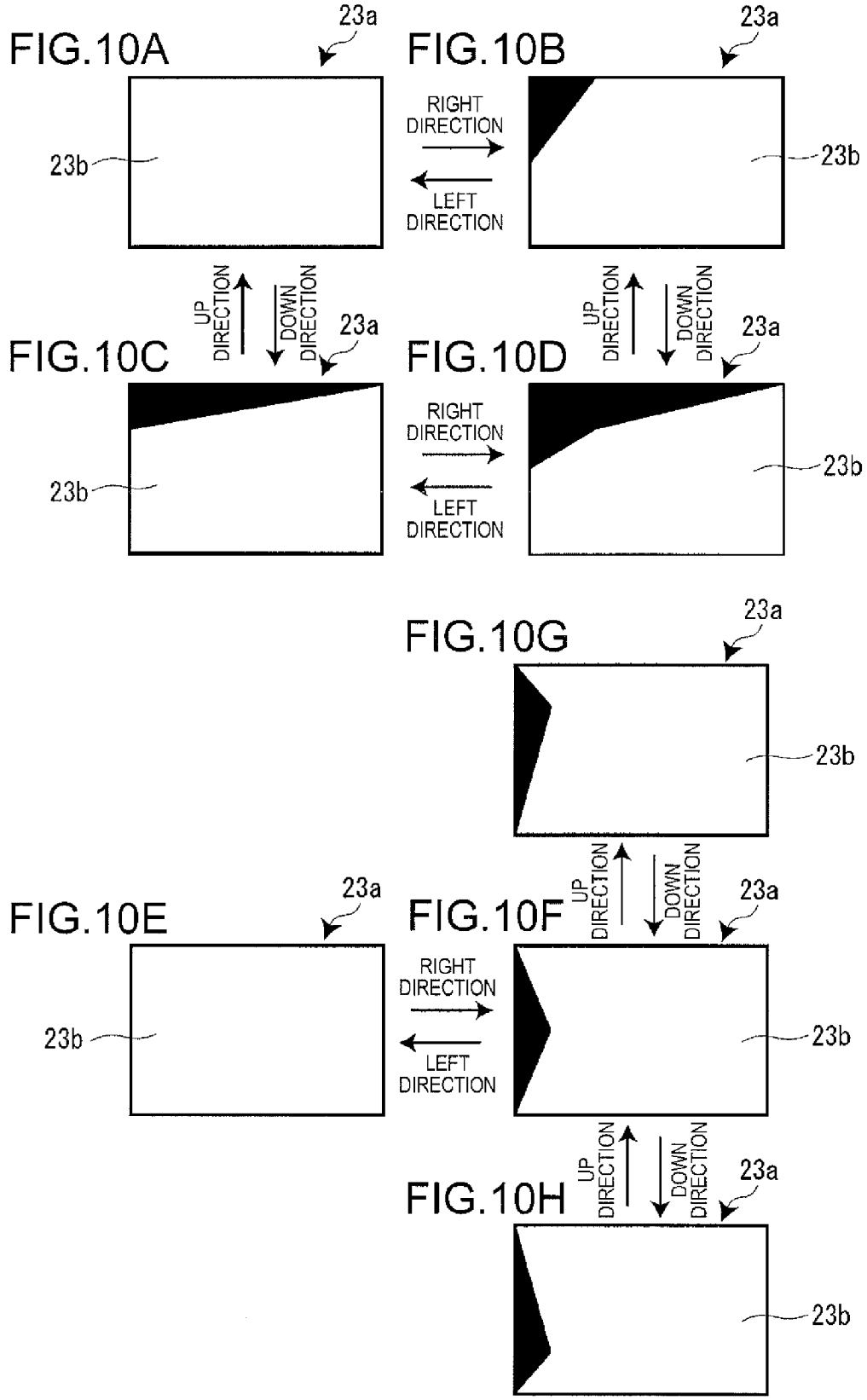

IMAGE DISPLAY DEVICE AND IMAGE ADJUSTMENT METHOD OF IMAGE DISPLAY DEVICE

CROSS-REFERENCE

The entire disclosure of Japanese Patent Application No. 2012-224849, filed Oct. 10, 2012 is expressly incorporated by reference herein.

BACKGROUND

1. Technical Field

The present invention relates to an image display device that displays an image on an image display surface and an image adjustment method of an image display device.

2. Related Art

Heretofore, projectors have been known in which trapezoidal distortion generated when an image is projected onto a projection surface by an image display device (projector) in a tilted state can be corrected by a user's operation. For example, JP-A-2010-250041 discloses that a trapezoidal distortion correction of a projection image is performed by displaying four identification images corresponding to corner portions of four corners of the image and moving, based on a user's operation, a corner portion corresponding to an identification image selected by a user from the four identification images.

When an image display device projects an image, the image is sometimes projected onto a projection surface having a corner composed of a plurality of surfaces (for example, a projection surface or the like having a corner composed of two surfaces). In this case, since the shape of the projected image is distorted due to an influence of the corner of the projection surface, the distortion needs to be corrected. However, the shape of the image projected onto the projection surface having the corner described above cannot be corrected by simply moving the corner portions of the four corners of the image as in the related art. Therefore, there is a demand for an image display device including a function capable of properly correcting the shape of an image projected onto a projection surface having a corner composed of a plurality of surfaces.

SUMMARY

An advantage of some aspects of the invention is to provide an image display device capable of performing a shape correction of an image displayed on an image display surface having a corner composed of a plurality of surfaces and an image adjustment method of an image display device.

An aspect of the invention is directed to an image display device that displays an image modulated by a light modulation device on an image display surface, the image display device including: an OSD display unit that displays at least one of identification images respectively corresponding to four sides of the image; an identification image selection unit that accepts an operation of selecting the displayed identification image; a moving operation unit that accepts an operation of moving a node set at a predetermined position of the side corresponding to the identification image selected with the identification image selection unit; and an image correction unit that corrects the shape of the image by moving, based on the operation accepted with the moving operation unit, the node of the image displayed on an image display surface composed of a plurality of surfaces.

Another aspect of the invention is directed to an image adjustment method of an image display device that displays an image modulated by a light modulation device on an image display surface, the method executing: displaying at least one of identification images respectively corresponding to four sides of the image; accepting an operation of selecting the displayed identification image; and correcting the shape of the image by moving, based on a moving operation of a node set at a predetermined position of the side corresponding to the selected identification image, the node of the image displayed on an image display surface composed of a plurality of surfaces.

According to these configurations, the identification images respectively corresponding to the four sides of the image displayed on the image display surface are displayed, and the shape of the image is corrected based on the moving operation of the node of the side corresponding to the identification image selected from the identification images. That is, it is possible to perform a shape correction on the basis of the node of the side of the image. Therefore, even when the image is displayed on an image display surface having a corner composed of a plurality of surfaces, the shape of the image can be properly corrected.

Moreover, the user can move the node of the side, while viewing the displayed image, to deform (correct) the shape of the image. Therefore, the user can perform the correction while visually grasping how the shape of the image is actually corrected.

In the image display device according to the aspect of the invention, it is preferable that the image display device further includes a mode selection unit that accepts an operation of selecting any one of a horizontal corner mode in which a shape correction of the image displayed on the image display surface having in the horizontal direction a corner composed of a plurality of surfaces is performed and a vertical corner mode in which a shape correction of the image displayed on the image display surface having in the vertical direction a corner composed of a plurality of surfaces is performed, and that the OSD display unit displays at least one of the identification images respectively corresponding to two sides of the image in the horizontal direction when the horizontal corner mode is selected, and displays at least one of the identification images respectively corresponding to two sides of the image in the vertical direction when the vertical corner mode is selected.

According to the configuration, the identification image of the side (side considered to need to be corrected) of the image on which a shape correction can be performed is displayed according to the shape (whether a corner is present in the horizontal direction or the vertical direction) of the image display surface by the selection of the mode. Due to this, the user can easily recognize which portion (the node of the side) the user moves to correct the shape of the image.

In the image display device according to the aspect of the invention, it is preferable that the image display device further includes a guide display unit that displays a guide for indicating at least the node of the side of the image displayed on the image display surface. Moreover, the identification images respectively corresponding to corner portions of four corners of the image may be displayed.

According to the configuration, it is possible to easily recognize the position of the node set at a predetermined position of the side of the image. The guide may be a cross-shaped line that divides an image into quarters, or a graphic such as a circle or a square may be displayed at the nodes of the sides. Alternatively, a grid-like guide that divides an image into quarters may be displayed to indicate not only the nodes of the sides but also the corner portions of the four corners. Since an image correction can be performed also on the corner portions, the correction becomes easier.

BRIEF DESCRIPTION OF THE DRAWINGS

The invention will be described with reference to the accompanying drawings, wherein like numbers reference like elements.

FIGS. 2A to 2D each show an example of an image projected onto a projection surface of a two-surface corner, in which FIG. 2A is a diagram for explaining the case of projecting an image onto a projection surface where a corner is formed in the horizontal direction and the corner is convex on a projector side; FIG. 2B is a diagram for explaining the case of projecting an image onto a projection surface where a corner is formed in the horizontal direction and the corner is convex in a direction away from the projector; FIG. 2C is a diagram for explaining the case of projecting an image onto a projection surface where a corner is formed in the vertical direction and the corner is convex on the projector side; and FIG. 2D is a diagram far explaining the case of projecting an image onto a projection surface where a corner is formed in the vertical direction and the corner is convex in the direction away from the projector.

FIGS. 6A and 6B are diagrams each for explaining a corner-wall correction adjustment screen for horizontal corner, in which FIG. 6A is a diagram for explaining a screen shown when an identification image showing an upper left corner portion is selected; and FIG. 6B is a diagram for explaining a screen shown when an identification image showing an upper side is selected.

FIGS. 7A to 7D are diagrams for explaining changes in the image forming region caused by moving the upper left corner portion when selecting the horizontal corner; and FIGS. 7E to 7H are diagrams for explaining changes in the image forming region caused by moving a midpoint of the upper side when selecting the horizontal corner.

FIGS. 9A and 9B are diagrams each for explaining a corner-wall correction adjustment screen for vertical corner, in which FIG. 9A is a diagram for explaining a screen shown when an identification image showing the upper left corner portion is selected; and FIG. 9B is a diagram for explaining a screen shown when an identification image showing a left side is selected.

FIGS. 10A to 10D are diagrams for explaining changes in the image forming region caused by moving the upper left corner portion when selecting the vertical corner; and FIGS. 10E to 10H are diagrams for explaining changes in the image forming region caused by moving the midpoint of the left side when selecting the vertical corner.

DESCRIPTION OF EXEMPLARY EMBODIMENTS

Figure 1:
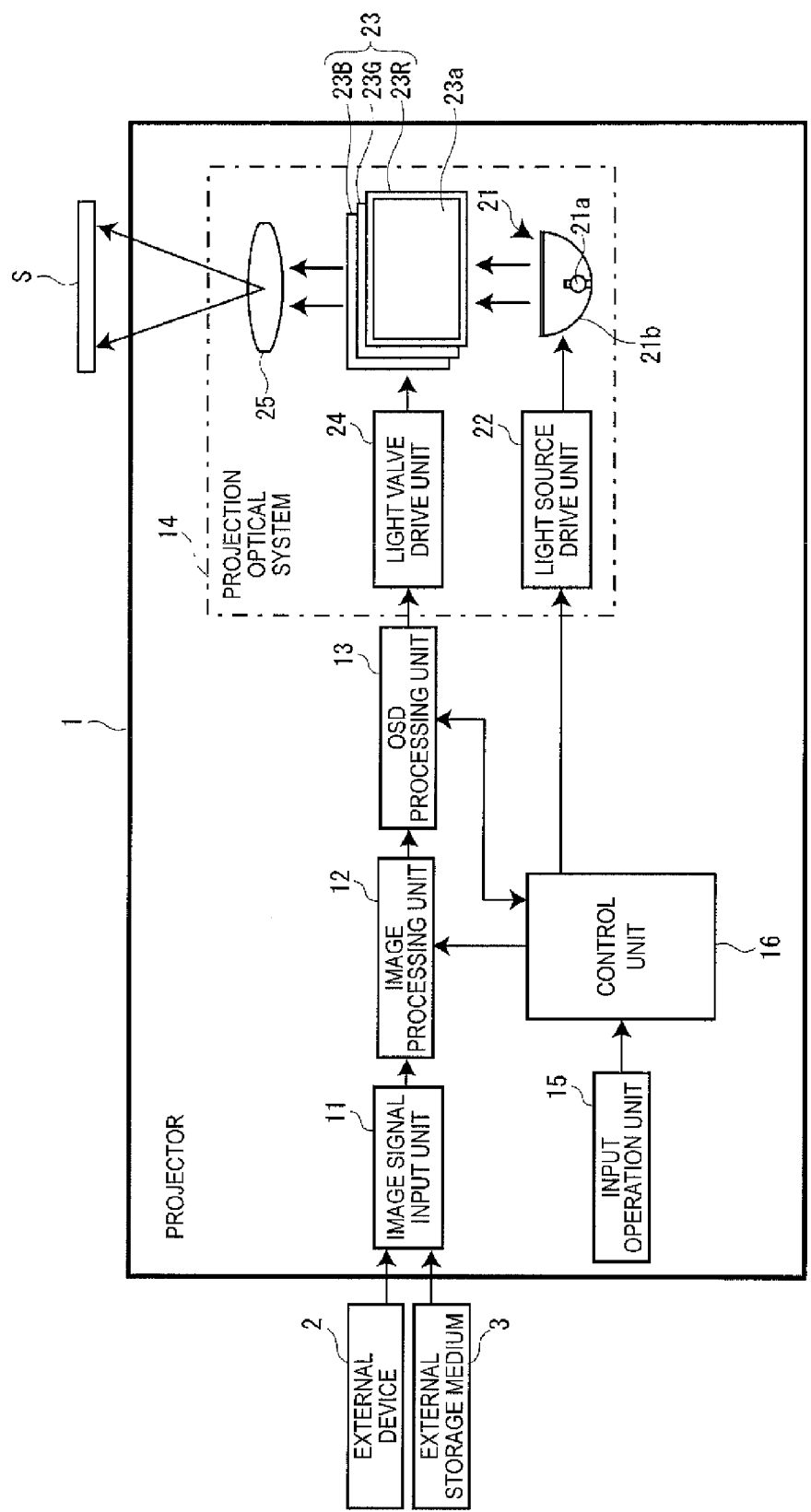
FIG. 1 is a block diagram showing the configuration of a projector according to an embodiment.

Hereinafter, an image display device and an image adjustment method of an image display device according to an embodiment of the invention will be described with reference to the accompanying drawings. In the embodiment, a projector 1 will be described by way of example as an image display device. FIG. 1 is a block diagram showing the configuration of the projector 1. As shown in the drawing, the projector 1 includes an image signal input unit 11, an image processing unit 12 (image correction unit), an OSD processing unit 13, a projection optical system 14, an input operation unit 15, and a control unit 16 that controls these units.

The image signal input unit 11 receives image information (image signal) from an external device 2 such as a personal computer or a DVD player, or an external storage medium 3 such as a USE memory or a compact flash (registered trademark).

The image processing unit 12 executes, based on an image processing program previously stored therein, predetermined image processing on the image information received with the image signal input unit 11. The predetermined image processing includes image quality adjustment such as resolution conversion, sharpness adjustment, or luminance adjustment, and a shape correction of an image or the like.

The OSD processing unit 13 performs, based on an instruction of the control unit 16, processing of superimposing an OSD (on-screen display) screen composed of a menu image or message image (OSD image) and the like on the image information input from the image processing unit 12. The OSD processing unit 13 includes an OSD memory (not shown) to store therein OSD image information representing a graphic, a font, or the like for forming the OSD image. When the control unit 16 instructs to superimpose an OSD image, the OSD processing unit 13 reads necessary OSD image information from the OSD memory and executes processing of superimposing the OSD image information on the input image information at a predetermined position. The image information combined with the OSD image information is output to a light valve drive unit 24. On the other hand, when there is no instruction from the control unit 16 to superimpose the OSD image, the OSD processing unit 13 outputs the image information input from the image processing unit 12 as it is to the light valve drive unit 24. The OSD processing unit 13 mainly constitutes the "OSD display unit" and the "guide display unit" in the appended claims.

The projection optical system 14 projects an image onto a projection surface S (image display surface) such as a screen. The projection optical system 14 has a light source unit 21, a light source drive unit 22, a liquid crystal light valve 23 (light modulation device), the light valve drive unit 24, and a projection lens 25.

The light source unit 21 is composed of a light source lamp 21a and a reflector 21b. The light source lamp 21a is formed of a halogen lamp, a metal halide lamp, a high-pressure mercury lamp, or the like. The reflector 21b reflects light emitted from the light source lamp 21a in a substantially constant direction. The light (illumination light) emitted from the light source unit 21 is separated by a light separation optical system (not shown) into red (R), green G, and blue (B) color components and then incident on the liquid crystal light valve 23 (23R, 23G, and 23B) for each color. The light source drive unit 22 controls, based on an instruction from the control unit 16, the supply and stop of power to the light source unit 21 to switch the light source unit 21 on and off.

The liquid crystal light valve 23 is composed of a liquid crystal panel or the like having liquid crystal sealed between a pair of transparent substrates. The liquid crystal light valve 23 is formed with a rectangular pixel region 23a formed of a plurality of pixels arranged in a matrix. The liquid crystal light valve 23 can apply a drive voltage pixel by pixel to the liquid crystal. The light valve drive unit 24 applies a drive voltage according to image information to each pixel of the liquid crystal light valve 23 to thereby set the light transmittance of each pixel.

With the configuration described above, in the projection optical system 14, the light emitted from the light source unit 21 transmits through the pixel region 23a of the liquid crystal light valve 23 and thus is modulated, so that an image according to image information is formed for each of the color lights. The formed respective color images are combined pixel by pixel through a light combining optical system (such as a dichroic prism) (not shown), and projected onto the projection surface S through the projection lens 25.

The input operation unit 15 accepts an input operation from a user and includes a plurality of operating keys for the user to perform various instructions on the projector 1. The operating keys include, for example, a power supply key for switching a power supply on and off, a menu key for performing the display and ending of an OSD menu screen for various settings, an enter key for confirming an item selected on the OSD menu screen or the like, four direction keys corresponding to up, down, left, and right directions, and a cancel key for cancelling an operation or returning to the previous operation (screen). The input operation unit 15 mainly constitutes the "identification image selection unit", the "moving operation unit", and the "mode selection unit" in the appended claims.

When the user operates the various operating keys of the input operation unit 15, the input operation unit 15 outputs an operating signal according to the contents of the user's operation to the control unit 16. In the embodiment, the input operation unit 15 is used as operating means for performing an image shape correction (hereinafter referred to as "corner-wall shape correction function"), which is provided mainly as a function of an OSD menu, in the case of projecting an image onto the projection surface S having a wall shape and a corner composed of two surfaces (the projection surface S of a two-surface corner) (described in detail later).

The input operation unit 15 may be configured using a remote control (not shown) capable of remote operation. In this case, the remote control transmits an operating signal of an infrared ray according to the contents of the user's operation, and a remote-control signal receiving unit (not shown) receives the signal and sends it to the control unit 16.

The control unit 16 is composed of a CPU (Central Processing Unit), a ROM (Read Only Memory), a RAM (Random Access Memory), and the like. The CPU is a central processing unit that performs various types of arithmetic processing. The control unit 16 inputs/outputs signals to/from each of the units to thereby integrally control the projector 1. The ROM stores control programs and control data that are used by the CPU to perform the various types of arithmetic processing. The control programs include the image processing program used in the image processing unit 12. The RAM is used as a working area for the CPU to perform the various types of arithmetic processing.

Next, the outline of image shape correction of the projector 1 in the case of projecting an image onto the projection surface S of a two-surface corner will be described with reference to FIGS. 2A to 2D. FIGS. 2A to 2D each show an example of a projection image G projected in a state where the projector 1 is installed in front of the projection surface S of a two-surface corner.

Figure 2A:
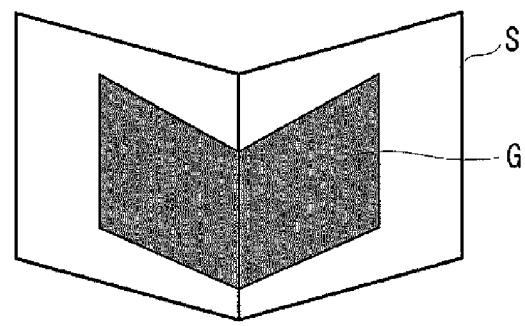

FIG. 2A shows an example in the case of projecting an image onto the projection surface S where a corner is formed in the horizontal direction and the corner is convex on the projector 1 side. In this case, the projection image G, which is displayed in a rectangle if the projection surface S is planar, is displayed in a shape in which an upper side portion of the image is recessed (concave shape) in a direction toward the center (downward) and a lower side portion thereof is raised (convex shape) in a direction away from the center (downward). Because of this, when an image having a shape distorted inversely with the projection image G (that is, an image having a shape in which an upper side portion of the image is raised in the direction away from the center and a lower side portion thereof is recessed in the direction toward the center) is set in the pixel region 23a, the distortion of the image can be canceled out to display a rectangular image on the projection surface S.

The shape of the distortion of the projection image G described above is illustrative only, and this is not limited thereto. The shape of the distortion of the projection image G varies depending on the angle at which the projection surface S is viewed or the angle of projection. That is, depending on the angle at which the projection surface S is viewed or the angle of projection, the image does not always have the shape in which the upper side portion is recessed in the direction toward the center and the lower side portion is raised in the direction away from the center even when the image is projected onto the projection surface S shown in FIG. 2A (the same applies to FIGS. 2B to 2D described below).

Figure 2B:
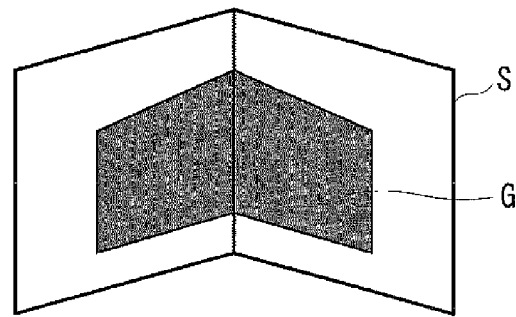

FIG. 2B shows an example in the case of projecting an image onto the projection surface S (concave surface) where a corner is formed in the horizontal direction and the corner is convex in a direction away from the projector 1. In this case, the projection image G, which is displayed in a rectangle if the projection surface S is planar, is displayed in a shape in which the upper side portion of the image is raised (convex shape) in a direction away from the center (upward) and the lower side portion thereof is recessed (concave shape) in a direction toward the center (upward). Because of this, when an image having a shape distorted inversely with the projection image G (that is, an image having a shape in which an upper side portion of the image is recessed in the direction toward the center and a lower side portion thereof is raised in the direction away from the center) is set in the pixel region 23a, the distortion of the image can be canceled out to display a rectangular image on the projection surface S.

Figure 2C:
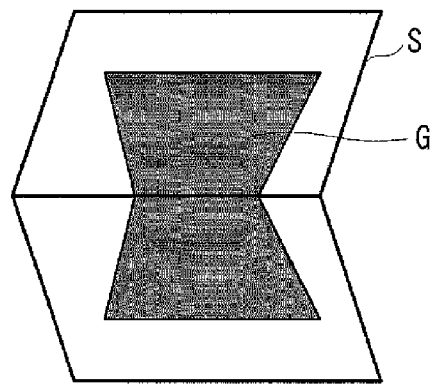

FIG. 2C shows an example in the case of projecting an image onto the projection surface S where a corner is formed in the vertical direction and the corner is convex on the projector 1 side. In this case, the projection image G, which is displayed in a rectangle if the projection surface S is planar, is displayed in a shape in which both left and right sides of the image are recessed (concave shape) in directions toward the center. Because of this, when an image having a shape distorted inversely with the projection image G (that is, an image having a shape in which both left and right sides of the image are raised in directions away from the center) is set in the pixel region 23a, the distortion of the image can be canceled out to display a rectangular image on the projection surface S.

Figure 2D:
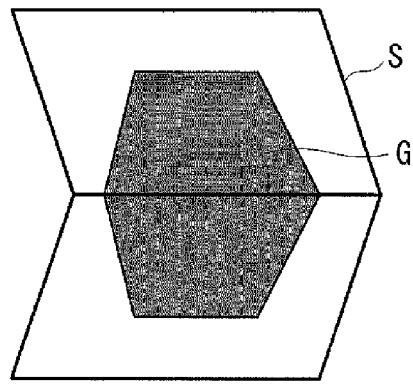

FIG. 2D shows an example in the case of projecting an image onto the projection surface S (concave surface) where a corner is formed in the vertical direction and the corner is convex in the direction away from the projector 1. In this case, the projection image G, which is displayed in a rectangle if the projection surface S is planar, is displayed in a shape in which both the left and right sides of the image are raised (convex shape) in the directions away from the center. Because of this, when an image having a shape distorted inversely with the projection image G (that is, an image having a shape in which both left and right sides of the image are recessed in the directions toward the center) is set in the pixel region 23a, the distortion of the image can be canceled out to display a rectangular image on the projection surface S.

In the embodiment, a shape correction of an image projected onto the projection surface S of a two-surface corner described above is performed using the corner-wall shape correction function (image shape correction function) provided on the OSD menu.

Figure 3:
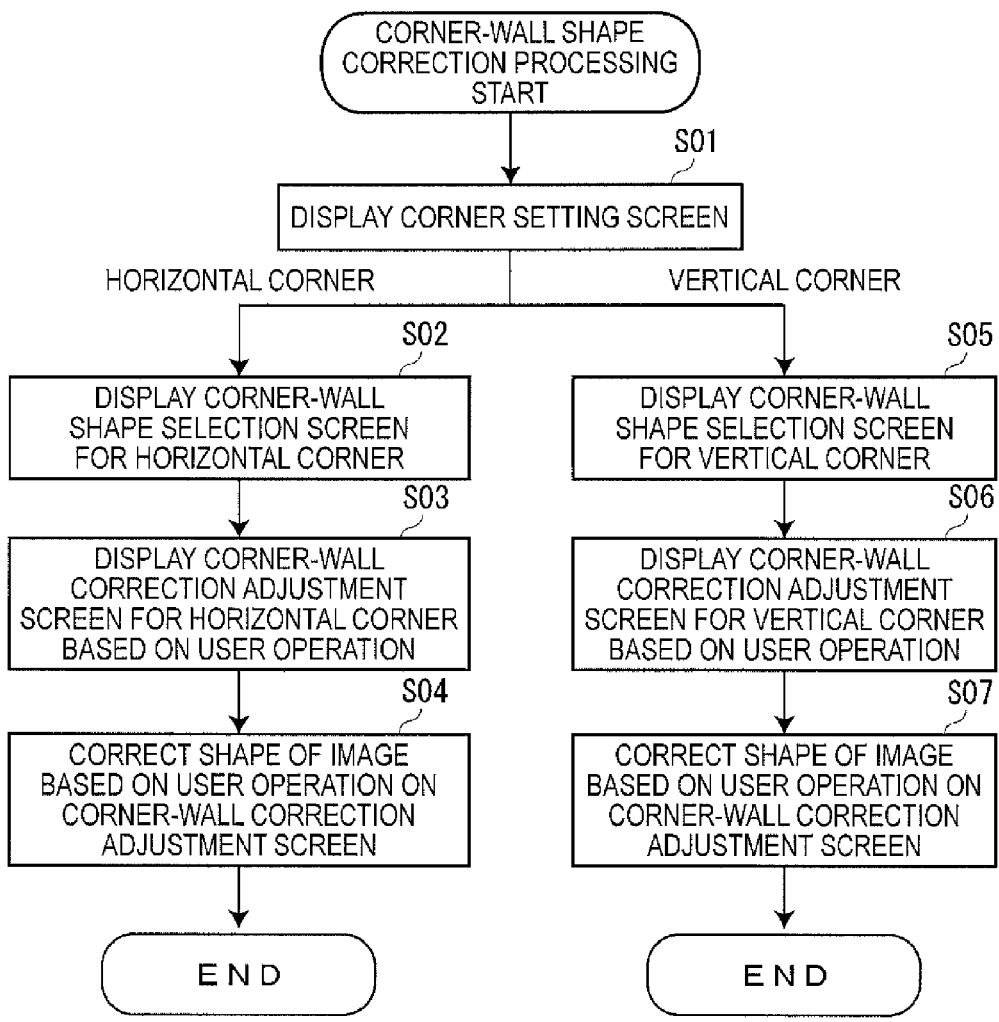
FIG. 3 is a flowchart showing a procedure of a corner-wall shape correction.

Next, with reference to FIGS. 3 to 10H, operations of the projector 1 when performing a shape correction (corner-wall shape correction) of an image projected onto the projection surface S of a two-surface corner will be described. FIG. 3 is a flowchart showing a procedure of the corner-wall shape correction. FIGS. 4 to 10H are diagrams for explaining examples of an operation screen that the user operates when executing the corner-wall shape correction and an operation method of the operation screen. FIGS. 4 to 10H each show a screen displayed in the pixel region 23a of the liquid crystal light valve 23.

First, when the item of "corner-wall shape correction" is selected from the OSD menu screen by the user, the control unit 16 of the projector 1 instructs the OSD processing unit 13 to display a corner setting screen D01 (refer to FIG. 4) (FIG. 3: S01).

Figure 4:
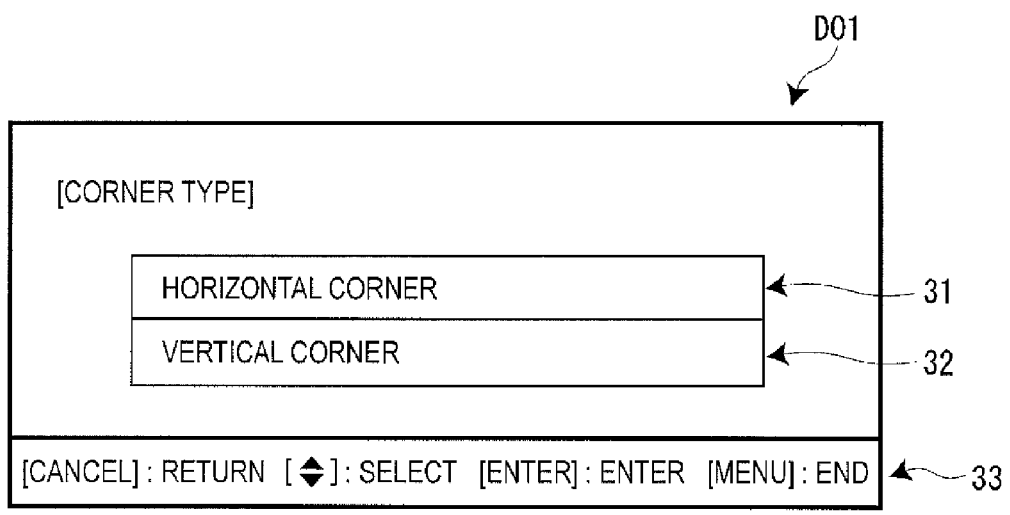
FIG. 4 is a diagram for explaining a corner setting screen.

As shown in FIG. 4, on the corner setting screen D01, options to select from two corner types, "horizontal corner 31 (horizontal corner mode)" and "vertical corner 32 (vertical corner mode)", and operation guidance information 33 are displayed. The "horizontal corner 31 (horizontal corner mode)" is selected when performing a shape correction of an image projected onto the projection surface S where a corner is formed in the horizontal direction, while the "vertical corner 32 (vertical corner mode)" is selected when performing a shape correction of an image projected onto the projection surface S where a corner is formed in the vertical direction. The operation guidance information 33 shows operable keys in the operating keys of the input operation unit 15 and the operations thereof.

On the corner setting screen D01, the user selects an item according to the shape of the projection surface S. That is, when the projection surface S has a shape shown in FIG. 2A or 23, the user selects the "horizontal corner 31". When the projection surface S has a shape shown in FIG. 2C or 2D, the user selects the "vertical corner 32".

Next, when the "horizontal corner 31" is selected on the corner setting screen D01 by the user operation, the control unit 16 instructs the OSD processing unit 13 to display a corner-wall shape selection screen for horizontal corner D02 (refer to FIGS. 5A and 5B) (FIG. 3: S02).

Figure 5A:
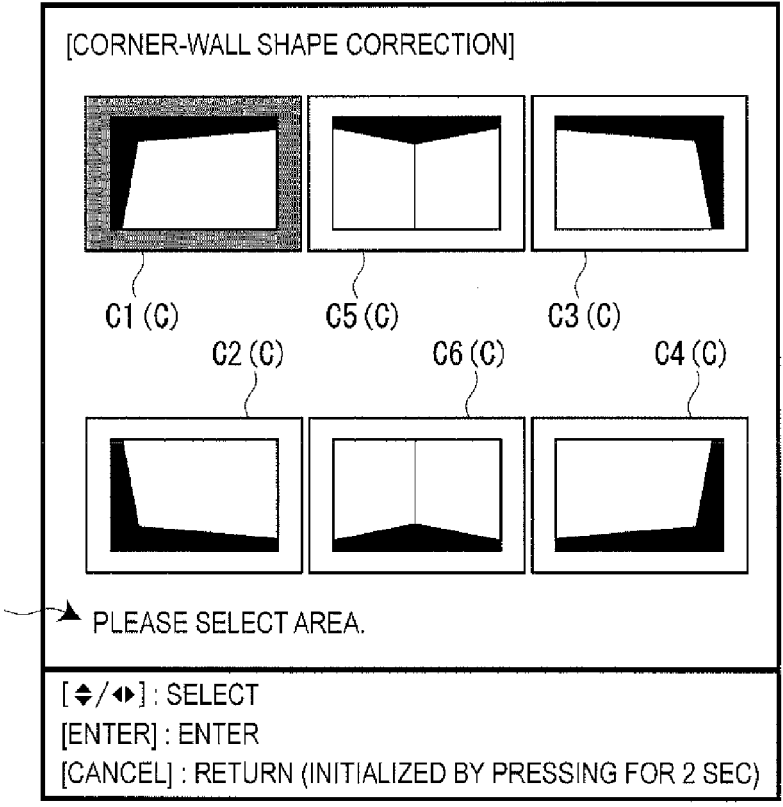
FIG. 5A is a diagram for explaining a corner-wall shape selection screen for horizontal corner.

As shown in FIG. 5A, six identification images C (C1 to C6), operation guidance information 41, and a message 42 ("Please select area.") for the user are displayed on the corner-wall shape selection screen for horizontal corner D02. The six identification images C (C1 to C6) correspond to portions whose positions are adjustable on the projection surface S where a corner is formed in the horizontal direction, that is, four corners (four corners of an image forming region 23b (refer to FIG. 5B) in the pixel region 23a) of an input image, and two sides thereof (upper and lower sides of the image forming region 23b) in the horizontal direction. The position adjustment of each of the upper and lower sides is performed by, specifically, adjusting (moving) the position of a midpoint (the node in the appended claims) of each of the upper and lower sides.

The identification images C are composed of the identification image C1 corresponding to an upper left corner portion of the image forming region 23b (input image), the identification image C2 corresponding to a lower left corner portion thereof, the identification image C3 corresponding to an upper right corner portion thereof, the identification image C4 corresponding to a lower right corner portion thereof, the identification image C5 corresponding to the upper side thereof, and the identification image C6 corresponding to the lower side thereof. In each of the identification images C1 to C6, an illustration representing the corresponding corner portion or side is depicted, so that the user can intuitively understand the correspondences between the respective corner portions and sides of the image forming region 23b and the identification images C1 to C6. Moreover, the outline of one of the identification images C1 to C6 is displayed in a color combination different from that of the other five images, which shows a state where the identification image C in the different color combination is selected (FIG. 5A shows a state where the identification image C1 is selected).

Figure 5B:
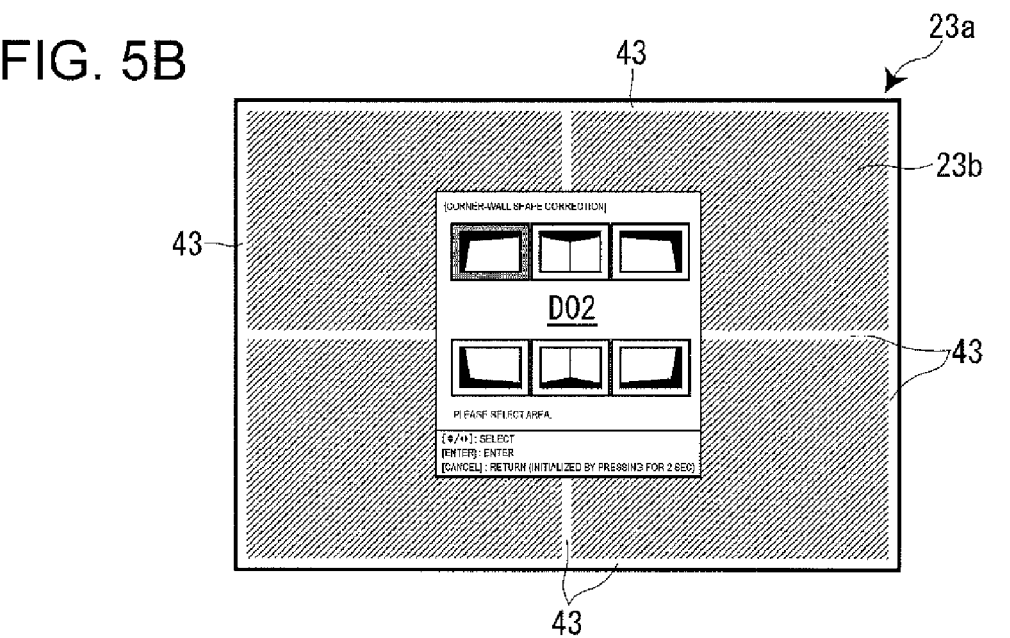
FIG. 5B is a diagram for explaining a guide displayed in an image forming region.

As shown in FIG. 5B, when displaying the corner-wall shape selection screen D02, a grid-like guide 43 (grid-like guide 43 that divides the image forming region 23b into quarters: a grid-like white line in the drawing) for indicating the corner portions of the four corners and the midpoints of the sides of the pixel region 23a (the image forming region 23b) is displayed in the pixel region 23a (the image forming region 23b). The guide 43 continues to be displayed during displaying a corner-wall correction adjustment screen D03 described later. This is to facilitate the user's grasp of where the corner or the midpoint of the side as an adjustment target (movement target) is (which portion moves with an operation) when the user performs various operations described later while viewing the image projected onto the projection surface S. It is possible by the user's operation of a predetermined key to display the guide 43 with an input image superimposed thereon, display the guide 43 alone, or erase the guide 43.

On the corner-wall shape selection screen D02, the user selects the identification image C corresponding to a position on which the user wants to perform a shape adjustment in the image projected onto the projection surface S. For example, when the user wants to adjust the position of the upper right corner portion of the image projected onto the projection surface 5, the user selects the identification image C3. For example, when the user wants to adjust the position of the upper side of the image projected onto the projection surface S, the user selects the identification image C5.

Next, when the desired identification image C is selected (entered) on the corner-wall shape selection screen D02 by the user, the control unit 16 instructs the OSD processing unit 13 to display the corner-wall correction adjustment screen for horizontal corner D03 (refer to FIGS. 6A and 6B) corresponding to the selected identification image C (FIG. 3: S03).

Figure 6A:
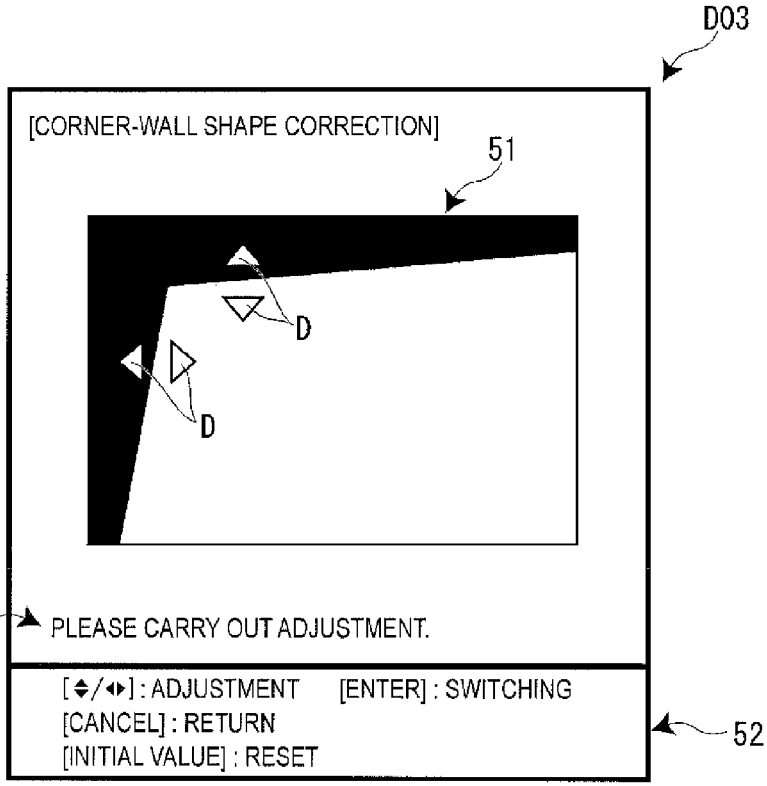
Figure 6B:
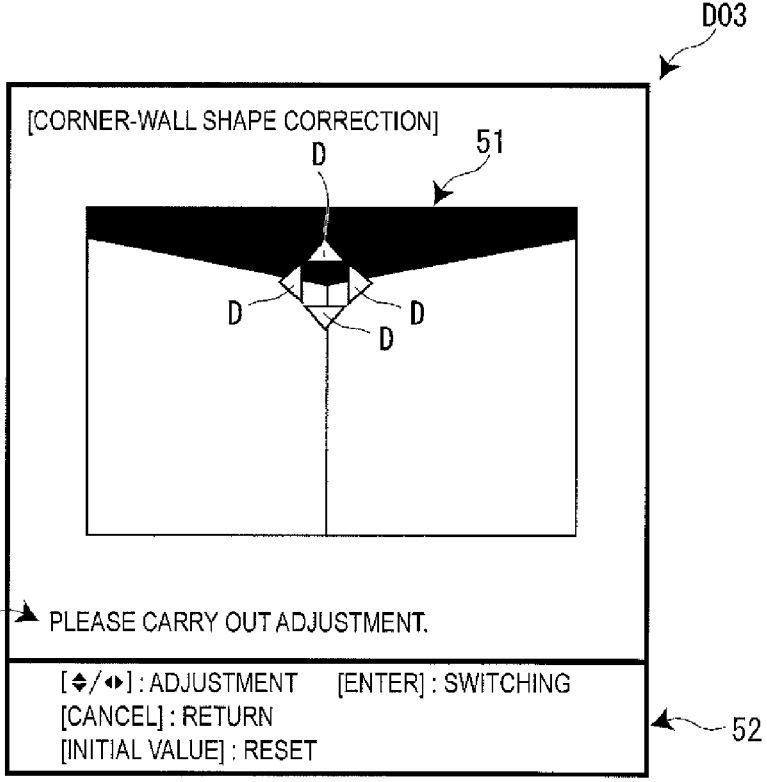

FIG. 6A is the corner-wall correction adjustment screen D03 shown when the identification image C1 is selected by the user, while FIG. 6B is the corner-wall correction adjustment screen D03 shown when the identification image C5 is selected by the user. On the corner-wall correction adjustment screen D03, an enlarged image 51 obtained by enlarging the identification image C selected on the corner-wall shape selection screen D02, operation guidance information 52, and a message 53 ("Please carry out adjustment.") for the user are displayed.

Triangular direction marks D representing up, down, left, and right directions are added to the enlarged image 51, which shows that the corner portion or the midpoint of the side corresponding to the enlarged identification image C is movable (adjustable in position) in the up, down, left, and right directions. That is, FIG. 6A shows that the upper left corner portion of the image forming region 23b (input image) is movable in the up, down, left, and right directions, while FIG. 6B shows that the midpoint of the upper side of the image forming region 23b (input image) is movable in the up, down, left, and right directions (the same applies to the corner-wall correction adjustment screen D03 corresponding to each of the other identification images C).

In a state where the corner-wall correction adjustment screen D03 is displayed, when the user operates the direction keys to thereby adjust the positions of the corner portions of the four corners or the midpoints of the upper and lower sides, the control unit 16 instructs the image processing unit 12 to execute the shape correction of the image forming region 23b according to the user operation (FIG. 3: S04).

With reference to FIGS. 7A to 7H, an example of change in shape of the image forming region 23b according to the user operation on the corner-wall correction adjustment screen for horizontal corner D03 will be described as a specific example of the processing in S04. FIGS. 7A to 7D show how the shape of the image forming region 23b (a white portion in the drawing) changes when a key operation is performed by the user in the state where the corner-wall correction adjustment screen D03 (refer to FIG. 6A) corresponding to the upper left corner portion (the identification image C1) is displayed.

For example, when the right direction key is operated in the state of FIG. 7A, the upper left corner portion of the image forming region 23b is moved to the right. With the movement of this corner portion, two sides connected to this corner portion (that is, a side connecting the upper left corner portion with the lower left corner portion and a side connecting the upper left corner portion with the midpoint of the upper side) are moved by a predetermined amount. Due to this, the image forming region 23b is deformed into a shape shown in FIG. 7B.

When the down direction key is operated in the state of FIG. 7A, the upper left corner portion of the image forming region 23b is moved downward. With the movement of this corner portion, two sides connected to this corner portion are moved by a predetermined amount. Due to this, the image forming region 23b is deformed into a shape shown in FIG. 7C.

When the down direction key is operated in the state of FIG. 7B, the upper left corner portion of the image forming region 23b is moved downward. With the movement of this corner portion, two sides connected to this corner portion are moved by a predetermined amount. Due to this, the image forming region 23b is deformed into a shape shown in FIG. 7D. Similarly, when the right direction key is operated in the state of FIG. 7C, the image forming region 23b is deformed into a shape shown in FIG. 7D.

The corner portions of the image forming region 23b cannot be moved to the outside of the pixel region 23a. Therefore, when the corner portion is located on the outer edge (on the border) of the pixel region 23a, that is, at the limit of a movable range, the control unit 16 ignores the key operation in directions toward the outside of the pixel region 23a (the same applies to the midpoints of the sides).

On the other hand, FIGS. 7E to 7H show how the shape of the image forming region 23b changes when a key operation is performed by the user in the state where the corner-wall correction adjustment screen D03 (refer to FIG. 6B) corresponding to the upper side (the identification image C5) is displayed.

For example, when the down direction key is operated in the state of FIG. 7E, the midpoint of the upper side of the image forming region 23b is moved downward. With the movement of this midpoint, the upper side (that is, a side connecting the upper left corner portion with the midpoint of the upper side and a side connecting the upper right corner portion with the midpoint of the upper side) is deformed, so that the image forming region 23b is deformed into a shape shown in FIG. 7F.

When the left direction key is operated in the state of FIG. 7F, the midpoint of the upper side of the image forming region 23b is moved to the left. With the movement of this midpoint, the upper side is deformed, so that the image forming region 23b is deformed into a shape shown in FIG. 7G.

When the right direction key is operated in the state of FIG. 7F, the midpoint of the upper side of the image forming region 23b is moved to the right. With the movement of this midpoint, the upper side is deformed, so that the image forming region 23b is deformed into a shape shown in FIG. 7H.

When the left or right direction key is operated in the state of FIG. 7E, the shape of the image forming region 23b does not change. However, with the rightward or leftward movement of the midpoint of the upper side of the image forming region 23b, the image displayed in the image forming region 23b is expanded or contracted by a predetermined amount.

In the above description, the case of operating the upper left corner portion or the midpoint of the upper side has been described. However, the shape change is performed by a similar method (algorithm) also in the case of operating the other corner portions or sides (midpoints).

Next, the case where the "vertical corner 32" is selected on the corner setting screen D01 (refer to FIG. 4) by the user operation will be described. When the "vertical corner 32" is selected by the user operation, the control unit 16 instructs the OSD processing unit 13 to display a corner-wall shape selection screen for vertical corner D04 (refer to FIGS. 8A and 8B) (FIG. 3: S05). The description of portions similar to those when selecting the horizontal corner 31 described above is omitted.

Figure 8A:
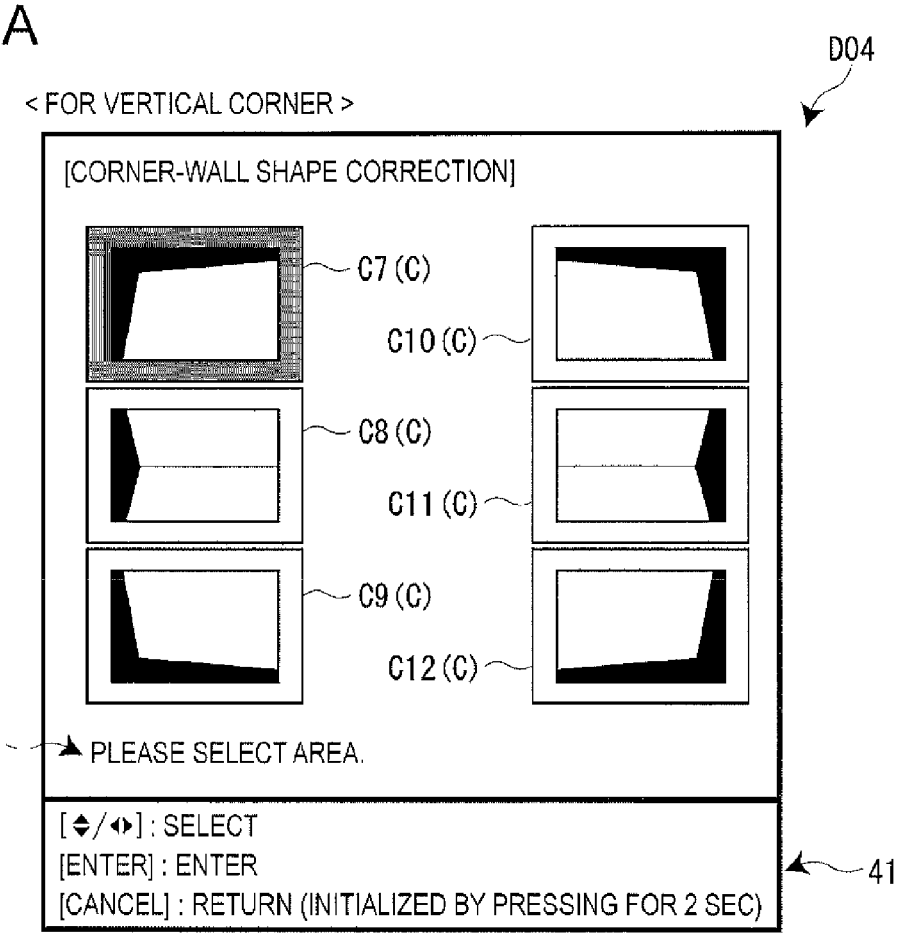
FIG. 8A is a diagram for explaining a corner-wall shape selection screen for vertical corner.
Figure 8B:
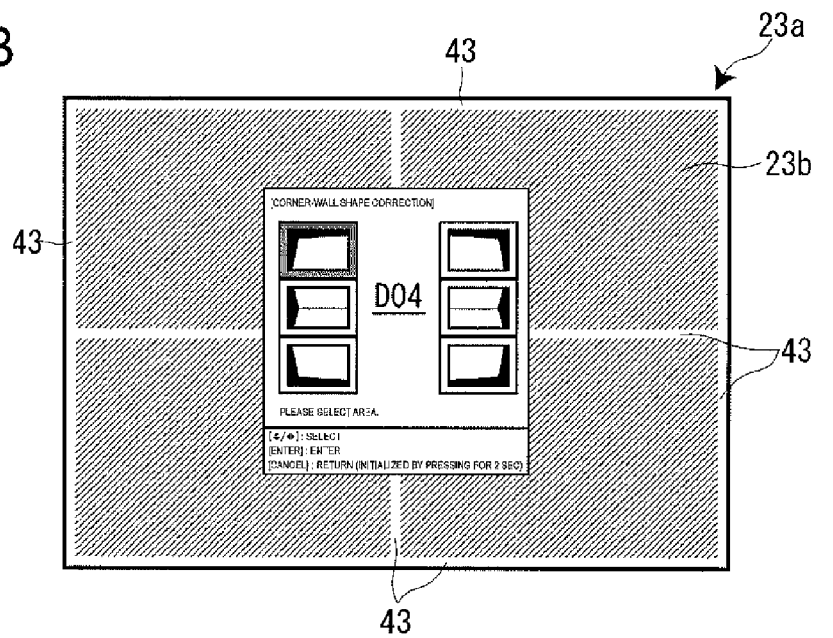
FIG. 8B is a diagram for explaining the guide displayed in the image forming region.

As shown in FIG. 8A, six identification images C (C7 to C12), the operation guidance information 41, and the message 42 ("Please select area.") for the user are displayed on the corner-wall shape selection screen for vertical corner D04. The six identification images C (C7 to C12) correspond to portions whose positions are adjustable on the projection surface S where a corner is formed in the vertical direction, that is, four corners of an input image (four corners of the image forming region 23b) and two sides thereof (left and right sides of the image forming region 23b) in the vertical direction.

The identification images C are composed of the identification image C7 corresponding to the upper left corner portion of the image forming region 23b (input image), the identification image C8 corresponding to the left side thereof, the identification image C9 corresponding to the lower left corner portion thereof, the identification image C10 corresponding to the upper right corner portion thereof, the identification image C11 corresponding to the right side thereof, and the identification image C12 corresponding to the lower right corner portion thereof. When displaying the corner-wall shape selection screen D04, the grid-like guide 43 for indicating the corner portions of the four corners and the midpoints of the sides is displayed in the pixel region 23a (the image forming region 23b) (FIG. 73).

Next, when the desired identification image C is selected (entered) on the corner-wall shape selection screen D04 by the user, the control unit 16 instructs the OSD processing unit 13 to display a corner-wall correction adjustment screen for vertical corner D05 (refer to FIGS. 9A and 9B) corresponding to the selected identification image C (FIG. 3: S06).

Figure 9A:
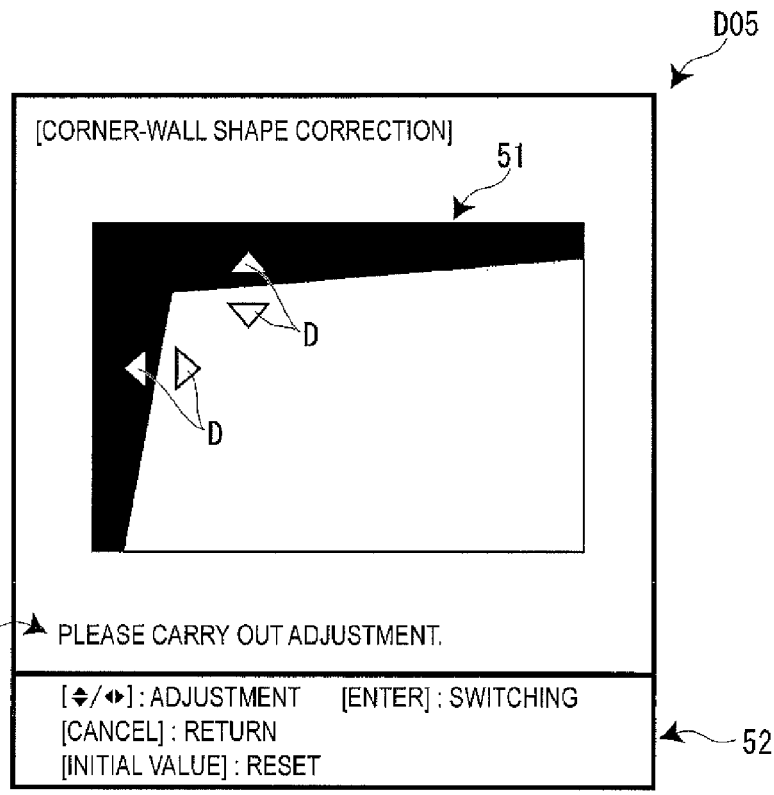
Figure 9B:
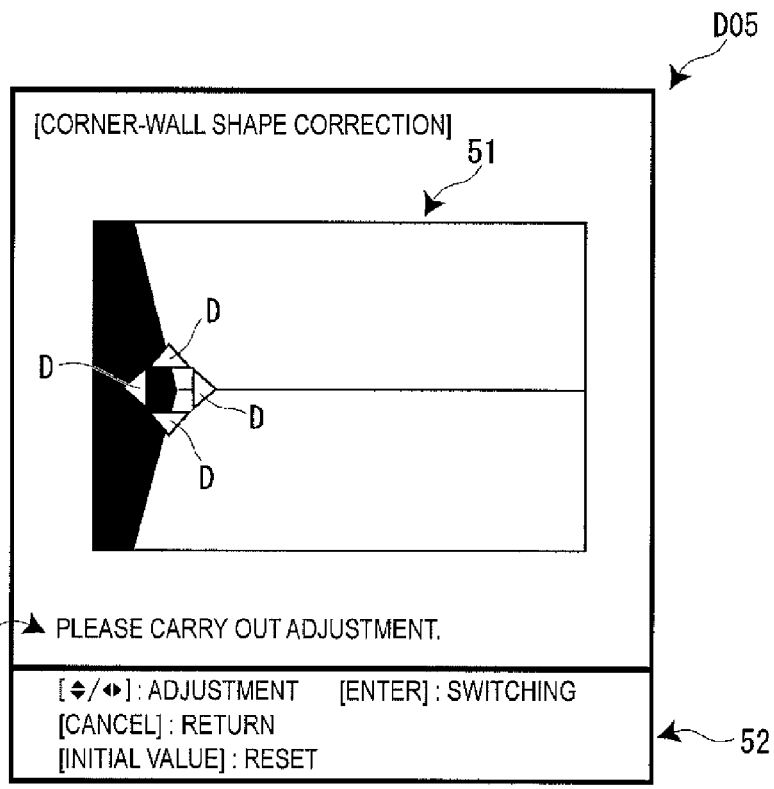

FIG. 9A is the corner-wall correction adjustment screen D05 shown when the identification image C7 is selected by the user. Although the screen configuration is similar to that of the corner-wall correction adjustment screen for horizontal corner D03 shown in FIG. 6A, a change in shape of the image forming region 23b associated with a position adjustment of the corner portion is different (described in detail later). FIG. 9B is the corner-wall correction adjustment screen D05 shown when the identification image C8 is selected by the user. The direction marks D representing that the midpoint of the left side of the image forming region 23b (input image) is movable in the up, down, left, and right directions are added to the enlarged image 51 on the screen.

In a state where the corner-wall correction adjustment screen D05 is displayed, when the user operates the direction keys to thereby adjust the positions of the corner portions of the four corners or the midpoints of the left and right sides, the control unit 16 instructs the image processing unit 12 to execute the shape correction of the image forming region 23b according to the user operation (FIG. 3: S07).

With reference to FIGS. 10A to 10H, an example of change in shape of the image forming region 23b according to the user operation on the corner-wall correction adjustment screen for vertical corner D05 will be described as a specific example of the processing in S07. FIGS. 10A to 10D show how the shape of the image forming region 23b changes when a key operation is performed by the user in the state where the corner-wall correction adjustment screen D0S (refer to FIG. 9A) corresponding to the upper left corner portion (the identification image C7) is displayed.

For example, when the right direction key is operated in the state of FIG. 10A, the upper left corner portion of the image forming region 23b is moved to the right. With the movement of this corner portion, two sides connected to this corner portion (that is, a side connecting the upper left corner portion with the upper right corner portion and a side connecting the upper left corner portion with the midpoint of the left side) are moved by a predetermined amount. Due to this, the image forming region 23b is deformed into a shape shown in FIG. 10B.

When the down direction key is operated in the state of FIG. 10A, the upper left corner portion of the image forming region 23b is moved downward. With the movement of this corner portion, two sides connected to this corner portion are moved by a predetermined amount. Due to this, the image forming region 23b is deformed into a shape shown in FIG. 10C.

When the down direction key is operated in the state of FIG. 10B, the upper left corner portion of the image forming region 23b is moved downward. With the movement of this corner portion, two sides connected to this corner portion are moved by a predetermined amount. Due to this, the image forming region 23b is deformed into a shape shown in FIG. 10D. Similarly, when the right direction key is operated in the state of FIG. 10C, the image forming region 23b is deformed into a shape shown in FIG. 10D.

On the other hand, FIGS. 10E to 10H show how the shape of the image forming region 23b changes when a key operation is performed by the user in the state where the corner-wall correction adjustment screen DOS (refer to FIG. 93) corresponding to the left side (the identification image C7) is displayed.

For example, when the right direction key is operated in the state of FIG. 10E, the midpoint of the left side of the image forming region 23b is moved to the right. With the movement of this midpoint, the left side (that is, a side connecting the upper left corner portion with the midpoint of the left side and a side connecting the lower left corner portion with the midpoint of the left side) is deformed, so that the image forming region 23b is deformed into a shape shown in FIG. 10F.

When the up direction key is operated in the state of FIG. 10F, the midpoint of the left side of the image forming region 23b is moved upward. With the movement of this midpoint, the left side is deformed, so that the image forming region 23b is deformed into a shape shown in FIG. 10G.

When the down direction key is operated in the state of FIG. 10F, the midpoint of the left side of the image forming region 23b is moved downward. With the movement of this midpoint, the left side is deformed, so that the image forming region 23b is deformed into a shape shown in FIG. 10H.

When the up or down direction key is operated in the state of FIG. 10E, the shape of the image forming region 23b does not change. However, with the upward or downward movement of the midpoint of the left side of the image forming region 23b, the image displayed in the image forming region 23b is expanded or contracted by a predetermined amount.

Next, with reference to FIGS. 11A to 11G, a specific procedure when performing a shape correction of an image projected onto the projection surface S of a two-surface corner will be described. Herein, a case will be described in which an image is projected onto the projection surface S where a corner is formed in the horizontal direction and the corner is convex on the projector 1 side. In the description of FIGS. 11A to 11G, the corner-wall shape selection screen for horizontal corner D02 and the corner-wall correction adjustment screen D03 are displayed, for convenience sake, at positions (on the right side in the drawing) outside the projection image G. Actually, however, the screens D02 and D03 are displayed by being superimposed on the projection image G. Arrows A in the drawings are shown for explaining the moving direction of the corner portion or the midpoint of the side of the projection image G, and not displayed actually.

Figure 11A:
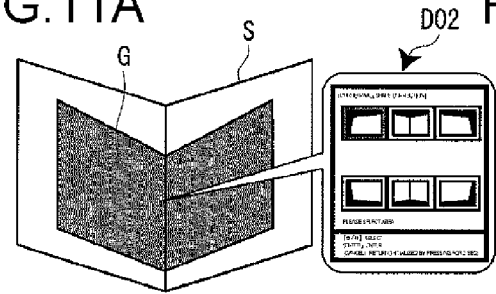
FIGS. 11A to 11G are diagrams for explaining a specific procedure when performing a shape correction of an image projected onto a projection surface of a two-surface corner.
Figure 11E:
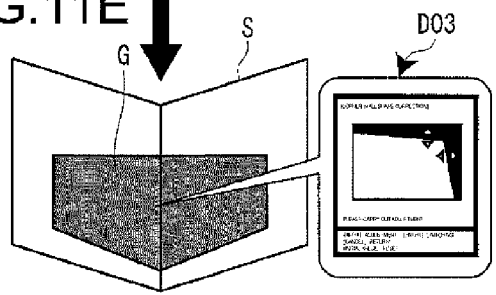
Figure 11B:
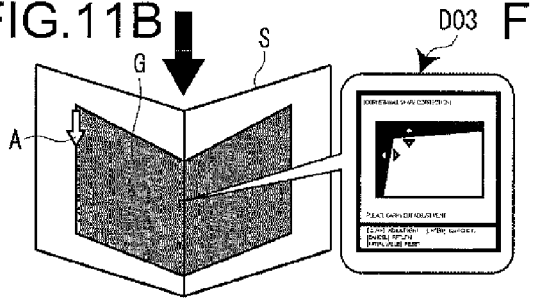

First, when the user selects the "horizontal corner 31" on the corner setting screen D01 (refer to FIG. 4), the corner-wall shape selection screen for horizontal corner D02 is displayed superimposed on the projection image G as shown in FIG. 11A. In this state, the user selects the identification image C1 corresponding to the upper left corner portion. Then, when the enter key is operated by the user, the projector 1 (the control unit 16) displays the corner-wall correction adjustment screen D03 (the corner-wall correction adjustment screen D03 with which the position of the upper left corner portion is adjustable) corresponding to the identification image C1 by superimposing on the projection image G (FIG. 11B).

In this state, the user moves the upper left corner portion by operating the direction key. In this case, the user operates the down direction key to move the upper left corner portion of the projection image G to a position at which the upper left corner portion is parallel to the midpoint of the upper side, so that the shape of the projection image G is adjusted to that shown in FIG. 11C.

Figure 11F:
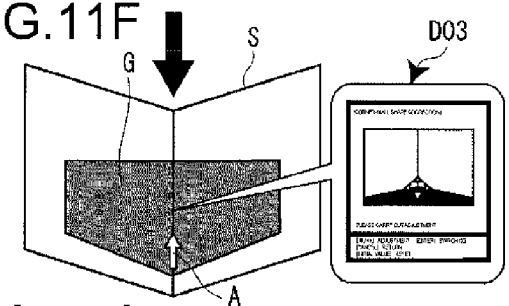
Figure 11C:
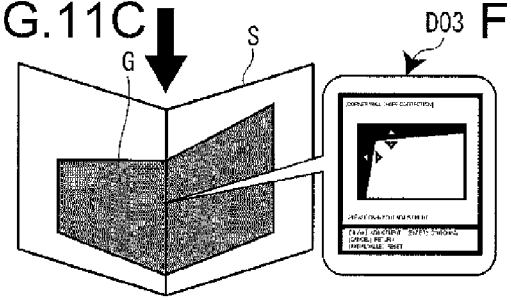
Figure 11G:
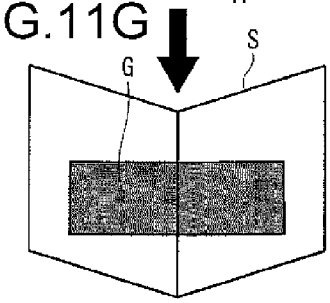
Figure 11D:
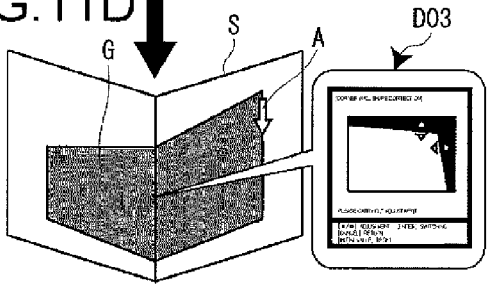

Next, the user selects on the corner-wall shape selection screen D02 the identification image C3 corresponding to the upper right corner portion. Then, when the enter key is operated by the user, the projector 1 (the control unit 16) displays the corner-wall correction adjustment screen D03 (the corner-wall correction adjustment screen D03 with which the position of the upper right corner portion is adjustable) corresponding to the identification image C3 by superimposing on the projection image G (FIG. 11D).

In this state, the user moves the upper right corner portion by operating the direction key. In this case, the user operates the down direction key to move the upper right corner portion of the projection image G to a position at which the upper right corner portion is parallel to the midpoint of the upper side, so that the shape of the projection image G is adjusted to that shown in FIG. 10E.

Next, the user selects on the corner-wall shape selection screen D02 the identification image C6 corresponding to the lower side. Then, when the enter key is operated by the user, the projector 1 (the control unit 16) displays the corner-wall correction adjustment screen D03 (the corner-wall correction adjustment screen D03 with which the position of the midpoint of the lower side is adjustable) corresponding to the identification image C6 by superimposing on the projection image G (FIG. 11F).

In this state, the user moves the midpoint of the lower side by operating the direction key. In this case, the user operates the up direction key to move the midpoint of the lower side of the projection image G to a position at which the midpoint of the lower side is parallel to the lower left corner portion and the lower right corner portion, so that the shape of the projection image G is adjusted to that shown in FIG. 11G. Through the operations described above, the distortion of the projection image G projected onto the projection surface S of a two-surface corner can be eliminated.

According to the embodiment as has been described above, the identification images C respectively corresponding to the corner portions of the four corners of an image displayed on the projection surface S and the four sides of the image are displayed, and the shape of the image is corrected based on the moving operation of the corner portion or the midpoint (node) of the side corresponding to the identification image C selected from the identification images C. That is, it is possible to perform not only a shape correction of the corner portion of the image but also a shape correction on the basis of the midpoint of the side of the image. Therefore, even when the image is displayed on the projection surface S of a two-surface corner, the shape of the image can be properly corrected.

Moreover, the user can move the corner portion or the midpoint of the side, while viewing the displayed image, to deform (correct) the shape of the image. Therefore, the user can perform the correction while visually grasping how the shape of the image is actually corrected.

Although, in the embodiment, the shape of the guide 43 is grid-like, this is not limited thereto. For example, the guide 43 may be a cross-shaped line that divides an image into quarters, or a graphic such as a circle or a square may be displayed at the corner portions or the midpoints of the sides.

Although, in the embodiment, two screens, the corner-wall shape selection screen for horizontal corner D02 and the corner-wall shape selection screen for vertical corner D04, are disposed, these may be put together as one screen. In this case, it is sufficient to display the identification images C so as to be distinguishable between selectable and non-selectable ones according to the selected corner type. For example, when the horizontal corner 31 is selected, the identification images C corresponding to the left and right sides are displayed in gray or the like so as to be non-selectable. When the vertical corner 32 is selected, the identification images C corresponding to the upper and lower sides are displayed in gray or the like so as to be non-selectable.

Although, in the embodiment, a case has been described in which an image is projected onto the projection surface S having a corner composed of two surfaces (the projection surface S of a two-surface corner), this is not limited thereto. The invention can be applied also to the case of projecting an image onto a projection surface S having a corner composed of a plurality of surfaces (three or more surfaces).

Although, in the embodiment, the light source unit 21 is composed of the light source lamp 21a of a discharge type, a solid-state light source such as a laser or an LED may be used.

Although, in the embodiment, a transmissive liquid crystal display system is adopted as the display system of the projector 1, any display principle, such as a reflective liquid crystal display system or a DLP (Digital Light Processing) (registered trademark) system, is possible. Moreover, in addition to the projector 1, the invention may be applied to a rear projector integrally including a transmissive screen, and an image display device such as a liquid crystal display.

Each function (each processing) of the projector 1 shown in the embodiment can be provided as a program. Moreover, the program can be stored in various recording media (a CD-ROM, a flash memory, and the like) to provide the same. That is, a program for causing a computer to function as each constituent component of the projector 1, and a recording medium having the program recorded thereon are also included in the scope of the appended claims.

Regardless of the embodiment described above, the device configuration, processing step, and the like of the projector 1 can be appropriately modified within a range not departing from the gist of the invention.

What is claimed is:

1. An image display device that displays an image modulated by a light modulation device on an image display surface, comprising:

an identification image selector that accepts an operation of selecting a displayed identification image corresponding to one of right, left, upper, and lower sides of the image;

a moving operator that accepts an operation of moving a node set on an image display surface at a predetermined position of a single side of the right, left, upper, and lower sides of the image, the single side corresponding to the identification image selected with the identification image selector, the predetermined position of the single side corresponding to a point where at least two non-parallel surfaces of the image display surface meet and corresponding to a mid-point of the single side; and a processor executing a program configured to:
  display the displayed identification image; and
  correct a shape of the image by moving, based on the operation accepted with the moving operator, the node of the image displayed on the image display surface composed of the at least two non-parallel surfaces.

2. The image display device according to claim 1, further comprising:
  a mode selector that accepts an operation of selecting a horizontal corner mode in which the shape of the image is corrected when the at least two non-parallel surfaces of the image display surface form a horizontal corner, or a vertical corner mode in which the shape of the image is corrected when the at least two non-parallel surfaces of the image display surface form a vertical corner,
  wherein the program is further configured to:
    display an identification image corresponding to one of the upper and lower sides of the image when the horizontal corner mode is selected; and
    display an identification image corresponding to one of the right and left sides of the image when the vertical corner mode is selected.

3. The image display device according to claim 1, wherein the program is further configured to:
  display a guide for indicating the node of the image displayed on the image display surface.

4. The image display device according to claim 1, wherein:
  the program is further configured to display identification images respectively corresponding to corner portions of four corners of the image,
  the identification image selector accepts an operation of selecting an identification image corresponding to the corner portion displayed by the program, and
  the moving operator accepts an operation of moving a node set at a predetermined position of the identification image corresponding to the corner portion selected with the identification image selector.

5. An image adjustment method of an image display device that displays an image modulated by a light modulation device on an image display surface, the method executing:
  displaying an identification image corresponding to one of right, left, upper, and lower sides of the image using the image display device;
  accepting an operation of selecting the displayed identification image;
  displaying a node set on an image display surface at a predetermined position of a single side of the right, left, upper, and lower sides of the image, the single side corresponding to the selected identification image on the image display surface, the predetermined position of the single side corresponding to a point where at least two non-parallel surfaces of the image display surface meet and corresponding to a mid-point of the single side;
  accepting a moving operation of the node; and
  displaying a movement of the node and a correction in a shape of the image based on the moving operation of the node.

* * * * *